March 4, 1941.    J. H. FOX    2,233,597

APPARATUS FOR MAKING COLORED SHEET GLASS

Filed Jan. 6, 1938    4 Sheets-Sheet 1

INVENTOR.
JOHN H. FOX
BY Bradley & Bell
ATTORNEYS.

March 4, 1941.   J. H. FOX   2,233,597
APPARATUS FOR MAKING COLORED SHEET GLASS
Filed Jan. 6, 1938   4 Sheets-Sheet 2

INVENTOR.
JOHN H. FOX
BY
ATTORNEYS.

March 4, 1941.   J. H. FOX   2,233,597
APPARATUS FOR MAKING COLORED SHEET GLASS
Filed Jan. 6, 1938   4 Sheets-Sheet 3
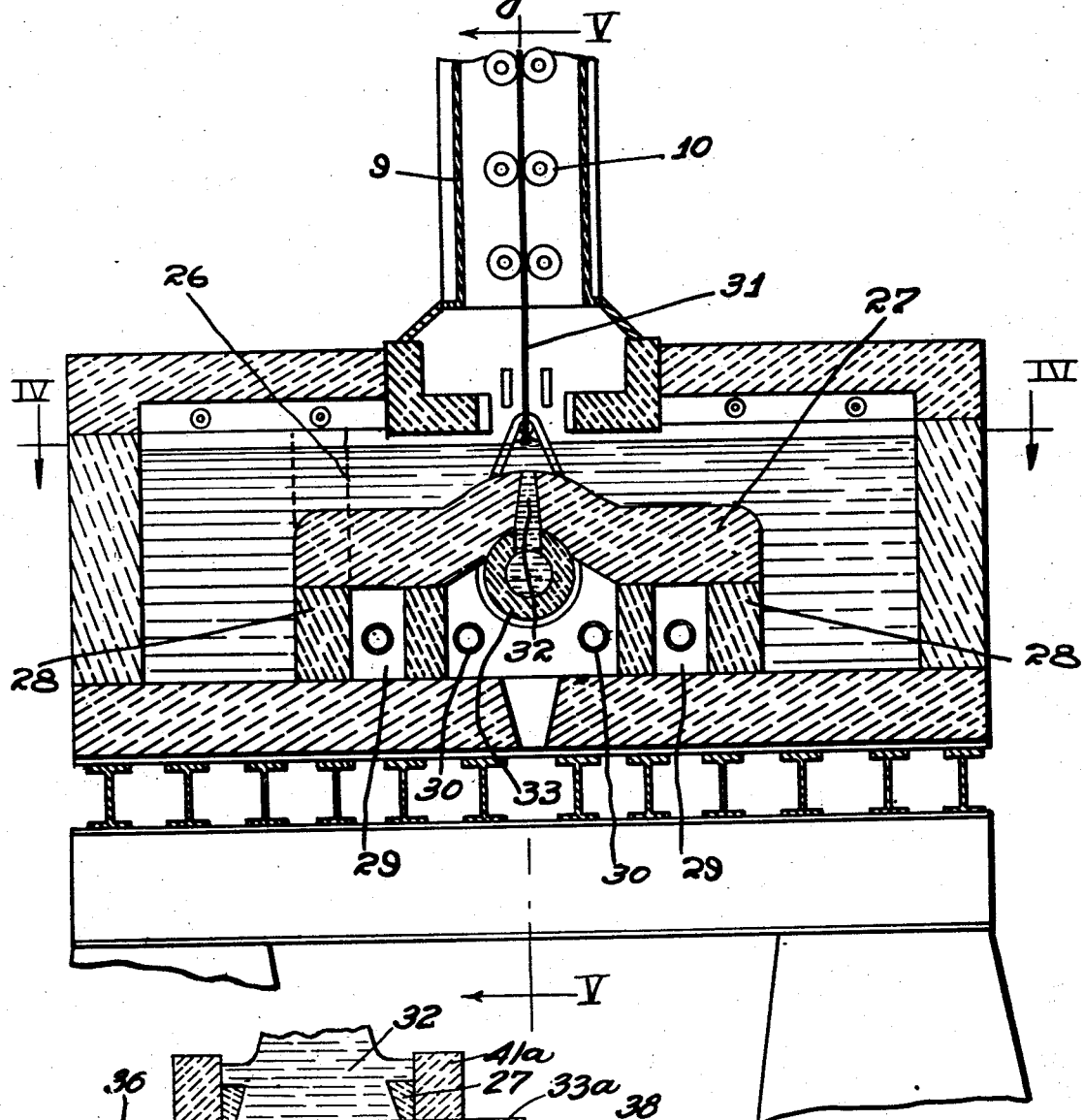
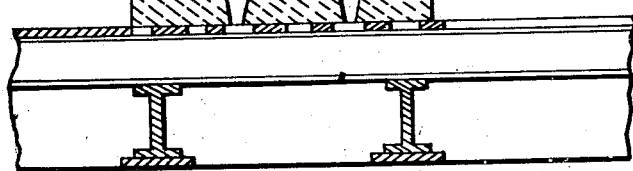
INVENTOR.
JOHN H. FOX
BY Bradley + Bee
ATTORNEYS.

March 4, 1941.   J. H. FOX   2,233,597
APPARATUS FOR MAKING COLORED SHEET GLASS
Filed Jan. 6, 1938   4 Sheets-Sheet 4
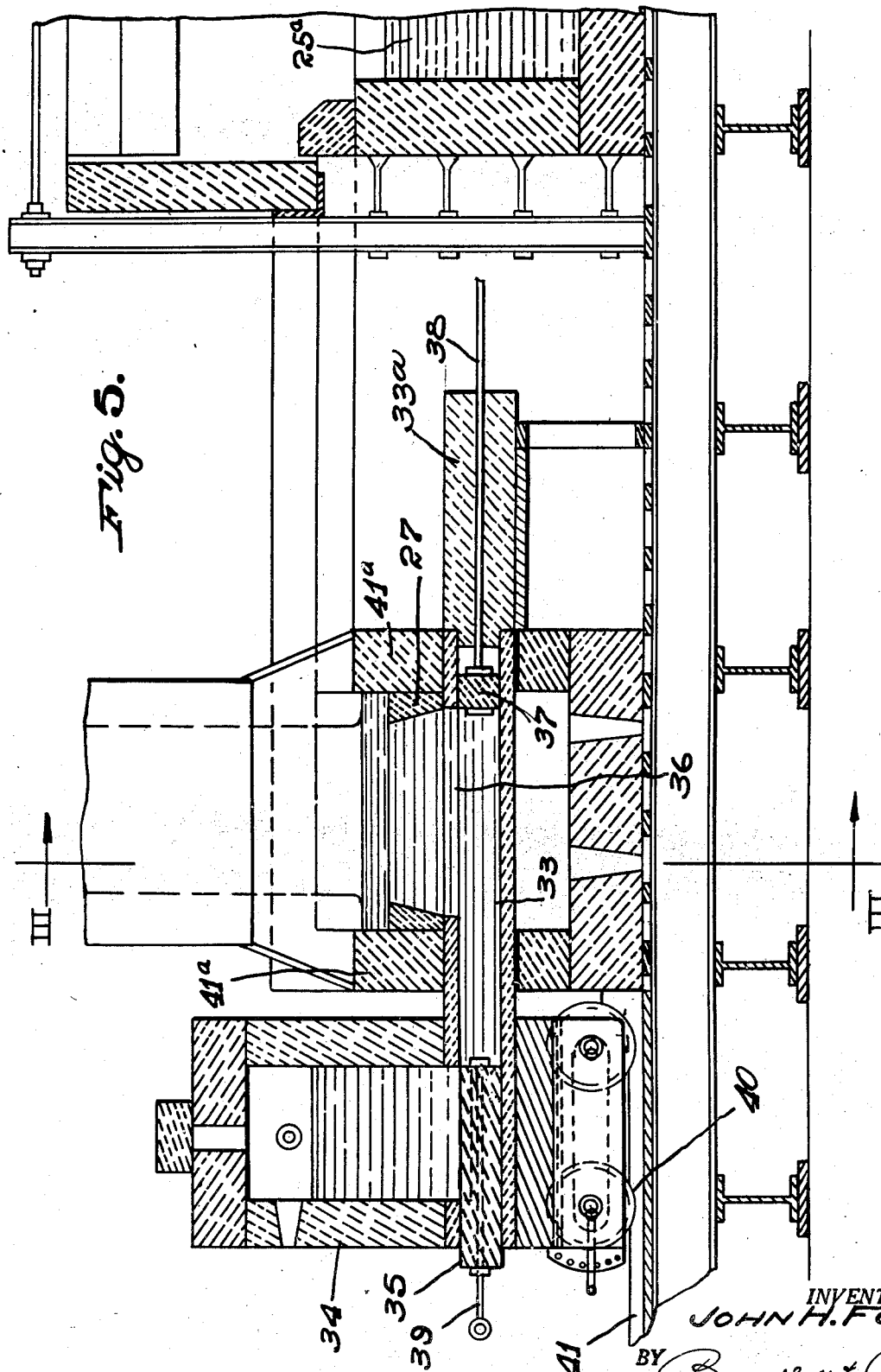

Patented Mar. 4, 1941

2,233,597

UNITED STATES PATENT OFFICE 2,233,597

APPARATUS FOR MAKING COLORED SHEET GLASS

John H. Fox, Pittsburgh, Pa., assignor to Pittsburgh Plate Glass Company, Allegheny County, Pa., a corporation of Pennsylvania Application January 6, 1938, Serial No. 183,650

3 Claims. (Cl. 49—17)

Figure 1:
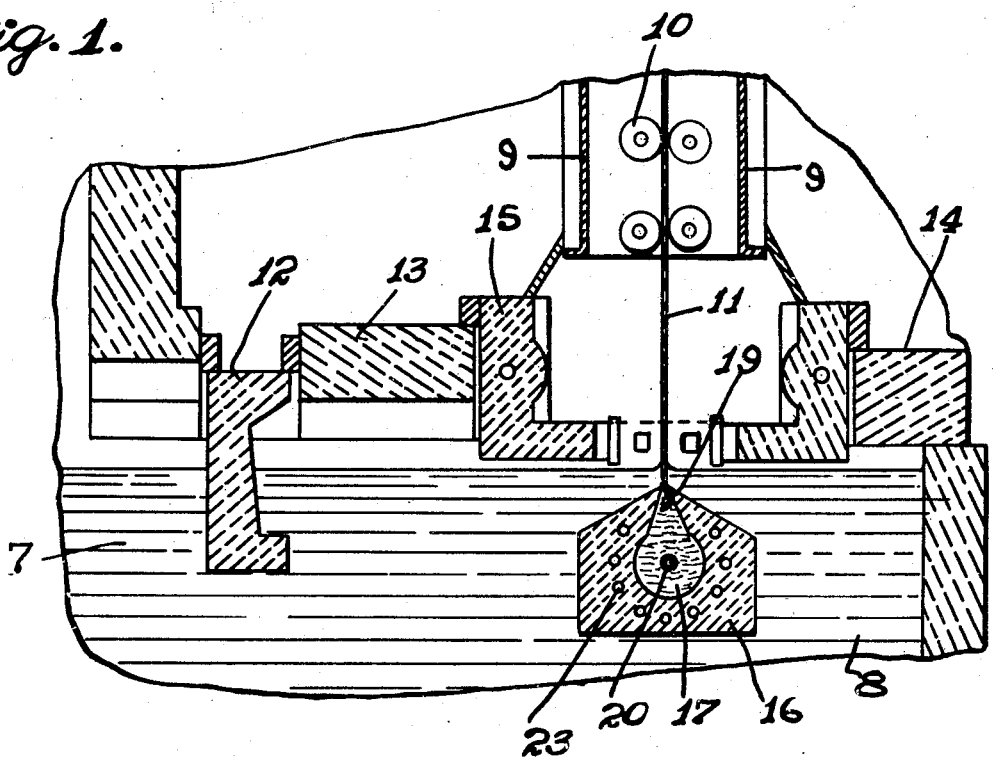
Figure 4:
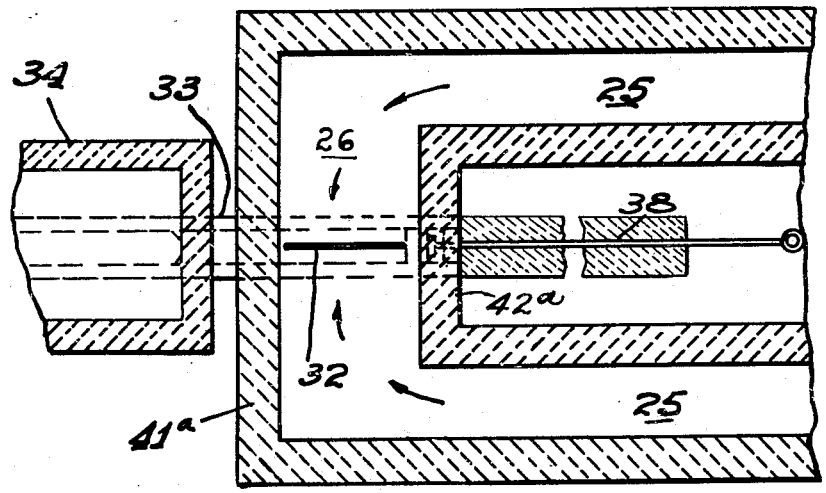
Figure 2:
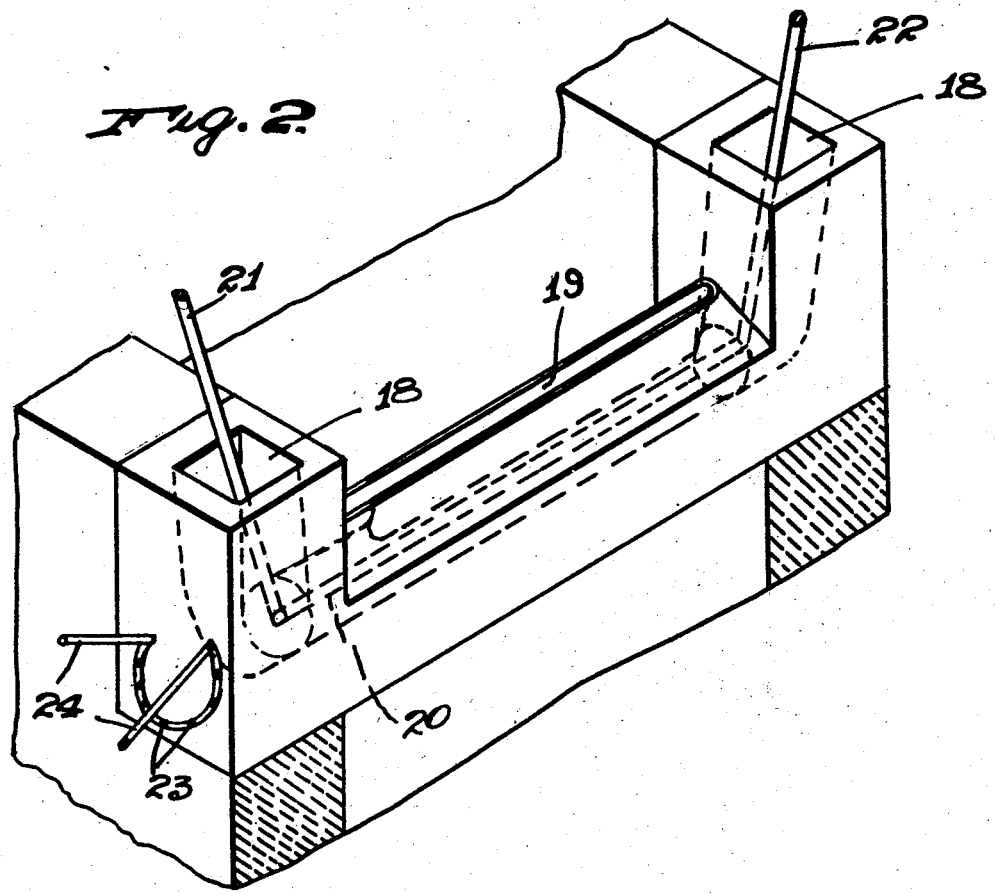
Figure 6:
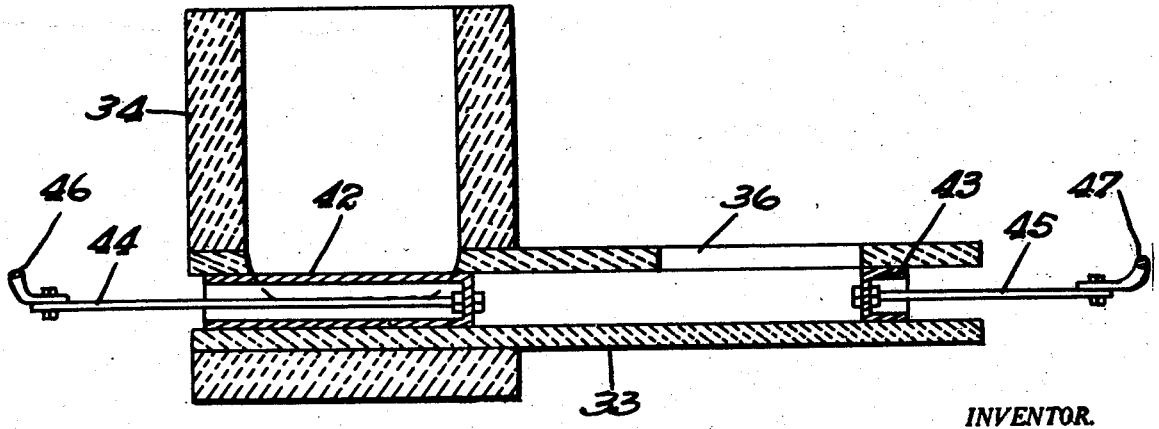

The invention relates to an apparatus whereby a colored glass may be made in an ordinary sheet glass machine, such as that of Slingluff or Colburn, by simple additions thereto permitting the making of ordinary colorless sheet glass when the color supply means are discontinued. It has been proposed heretofore to accomplish this result by feeding either colored glass in molten or powdered form onto the surface of the bath adjacent the line of draw of the sheet, so that a colored layer is supplied to one side of the sheet, the body of the sheet being of clear glass. This two-layer glass, known as "flashed glass," has a coating which is relatively thin and transparent, tending in some cases to separate from the body of clear glass, if the two glasses are not exactly "fitted" to each other. The present invention has for its objects the provision of an improved apparatus which will give a sheet colored throughout its central portion, as opposed to the "flashed" or two-layer glass, and which shows, with transmitted light, denser color and less transparency. Two forms of the apparatus are shown in the accompanying drawings, wherein:

Figure 1 is a partial vertical section through the apparatus. Fig. 2 is a detail perspective view. Fig. 3 is a vertical section through a modification on the line III—III of Fig. 5. Fig. 4 is a horizontal section on the line IV—IV of Fig. 3. Fig. 5 is a section on the line V—V of Fig. 3. Fig. 5a is a sectional view showing the means for closing the slot through the draw bar in the Fig. 3 construction. And Fig. 6 is a detail section showing a further modification.

Referring to the construction shown in Figs. 1 and 2, 7 is the end of a melting tank and 8 is a forehearth or drawing kiln, over which is mounted a drawing machine comprising the casing 9 and the pairs of driven rolls 10, by means of which a sheet 11 is drawn continuously from the bath in the forehearth. This is a well known drawing machine of the Fourcault or Slingluff type, and in operation, the glass sheet emerging from the top of the casing is cut in sections and removed in the usual manner. The forehearth is provided with the usual skim bar 12 and is covered by the plates 13 and 14 and the usual L-blocks 15. Extending transversely of the forehearth is a draw bar 16 of refractory material which performs the usual function of maintaining a constant line of draw and permitting a faster drawing speed than would otherwise be the case. This draw bar, however, instead of being of solid form, is hollow, being provided with the chamber 17 of approximately circular cross section extending throughout the length of the forehearth and registering at its ends in a pair of containers 18, 18 (Fig. 2) which are formed in the side walls of the tank. The upper side of the chamber 17 is provided with an outlet slot 19 for the passage of the glass which is fed to the chamber 17 from the containers 18, 18.

In operating the machine, molten colored glass is supplied to the containers 18 at intervals by means of ladles which remove the colored glass from a supplemental melting tank. The molten colored glass, thus supplied to the containers, flows through the chamber 17, filling it and is fed upward through the slot 19, the rate of flow being controlled by the head pressure in the containers 18, 18. The sheet 11, which is drawn from the bath, consists to a substantial extent of clear glass, which is supplied from the bath in the forehearth, such clear glass forming the surface layers of the sheet. The colored glass supplied from the chamber 17 flows upward through the bath and forms the central layer of the sheet.

As there is a tendency of the glass to freeze in the chamber 17, this action is guarded against by suitable electrical heating means. Two sets of means are shown. The first set includes a resistance element 20 of heat resisting composition extending longitudinally of the chamber and connected at its ends to the leads 21 and 22. The second heating means consists of the series of resistance rods 23 embedded in the draw bar and extending longitudinally therethrough. These rods are connected at their ends with electrical supply leads 24.

The tank construction of Figs. 3, 4 and 5 is of a different type from that of Figs. 1 and 2, being similar to that of the Gregorius Patent No. 2,006,-352, dated July 2, 1935. In this construction, the molten glass from the melting tank is conducted from a tank 25a (Fig. 5) through a pair of conduits 25, 25 to a draw pot or forehearth 26, which extends transversely of the conduits. In this case, the draw bar 27 constitutes the bottom of the forehearth, being supported by means of the wall members 28. The chambers 29 beneath the draw bar are suitably heated by burners 30 which project through openings at the ends of the chambers.

Mounted above the draw bar, is a drawing machine comprising the casing 9 and rolls 10 similar to that described in connection with the construction of Figs. 1 and 2. The glass sheet 31 is drawn from the bath above the center of the draw bar and colored glass is supplied to the center of the sheet through the slot 32, which lies directly beneath the line of draw of the sheet and extends the length of the draw bar. The molten colored glass is fed to the slot through the tubular delivery member 33 of refractory material which is carried at its outer end by a day tank 34, the bottom of the tank communicating with the delivery member through a slot in its bottom controlled by a sliding gate 35. The other end of the delivery tube is provided with a slot 36 which registers with the slot 32 in the draw bar under operating conditions. The right hand end of the tube is closed by means of a plug 37 having an operating rod 38. The gate 35 is also provided with an operating rod 39 and the volume of colored glass flowing to the sheet is governed by the position of the gate.

The day tank is provided with wheels 40 mounted on a suitable track 41, and after this tank has been emptied, it is moved to the left along the track thus withdrawing the tubular delivery member 33 from its position beneath the forehearth. The member 33 is guided and supported by the side walls 41a, 41a of the forehearth which have perforations therethrough in which the tube fits slidably. After the tube 33 is moved to the left away from the forehearth, the slot 32 is closed by means of a follow-up plug 33a having the same outside diameter as the tube 33 which is inserted through the right hand wall 41a as the tubular member 33 moves to the left, thus sealing the slot 32 at its lower end.

This structure is shown in greater detail in Figure 5a, wherein the follow-up plug 33a is drilled in order that the rod 38 controlling the plug 37 may pass therethrough. As the tube 33 is withdrawn from the forehearth, the plug 33a is moved either mechanically or by hand into position, bridging the space between the walls 41a and sealing the slot 32 in the draw bar 27.

When the tank 34 is removed from operative position after it has been emptied, another similar tank is brought into position, and the operation is continued with only a short interval of time as necessitated by the substitution of tanks as above described. The heating of the chamber surrounding the tubular member 33 beneath the draw bar serves to keep the tube and its colored glass content hot and reduces any tendency of the glass to solidify or freeze therein.

Fig. 6 illustrates a modification, in which the gate 42 of the day tank 34 and the plug 43 are made of heat resisting metal, such as nickel chromium or the like, such gate and plug being operated by the rods 44 and 45. These rods are connected to electric supply leads 46 and 47, so that in the operation of the device, the body of glass passing through the tubular member 33 may be heated by the passage of current therethrough, thus avoiding any danger of solidification and serving as a means for controlling the rate of flow. The sheet produced by this apparatus is the same as that produced by the apparatus of Figs. 1 and 2, in that it consists of a central layer of colored glass and surface layers of clear glass, the proportion of colored glass to clear glass being regulated by the amount of colored glass fed through the draw bar.

What I claim is:

1. Apparatus for making a glass sheet, comprising a forehearth for a glass bath, means above the bath for drawing a glass sheet continuously therefrom with the line of draw thereof transverse to the forehearth, a draw-bar beneath the line of draw having a vertical slot therethrough in parallel with said line of draw and opening downwardly through the bottom of the forehearth, a tubular delivery member beneath the forehearth having an outlet slot registering with the slot through the forehearth bottom, a container adapted to carry a body of molten colored glass lying at one side of the forehearth and communicating at its lower end with the delivery member, means for removing the tubular delivery member and container in communication therewith from registration with respect to the vertical slot in the draw-bar, and means for closing the vertical slot through the draw-bar when the tubular delivery member is removed therefrom.

2. Apparatus for making a glass sheet, comprising a forehearth for a glass bath, means above the bath for drawing a glass sheet continuously therefrom with the line of draw thereof transverse to the forehearth, a draw-bar beneath the line of draw having a vertical slot therethrough in parallel with said line of draw and opening downwardly through the bottom of the forehearth, a container adapted to carry a body of molten colored glass located at one side of the forehearth and mounted for horizontal movement toward and from the forehearth, a tubular delivery member projecting horizontally from the side of the container, and communicating therewith, being provided with an outlet slot on its upper side adapted in one position of the container to register with the lower end of the vertical slot through the draw-bar, and means for closing the vertical slot through the draw-bar when the container and tubular delivery member are retracted from operative position.

3. Apparatus for making a glass sheet, comprising a forehearth for a glass bath, means above the bath for drawing a glass sheet continuously therefrom with the line of draw thereof transverse to the forehearth, a draw-bar beneath the line of draw having a vertical slot therethrough in parallel with said line of draw and opening downwardly through the bottom of the forehearth, a container adapted to carry a body of molten colored glass located at one side of the forehearth and mounted for horizontal movement toward and from the forehearth, a tubular delivery member projecting horizontally from the side of the container and communicating therewith, being provided with an outlet slot on its upper side adapted in one position of the tank to register with the lower end of the vertical slot through the draw-bar, means for closing the vertical slot through the draw-bar when the tubular delivery member and container are retracted from operative position, and means exterior to the delivery tube in opposition to its outlet slot for heating the delivery member.

JOHN H. FOX.